United States Patent [19]

Horvath et al.

[11] Patent Number: 5,976,304
[45] Date of Patent: Nov. 2, 1999

[54] COATING SYSTEM AND ITS USE FOR PRODUCING POLYURETHANE ACRYLATE SURFACE COATINGS FOR LAMINATED SHEETS

[75] Inventors: Michael Horvath; Felix Wehrmann; Josef Weiss, all of Vienna, Austria

[73] Assignee: Isovolta Osterreichische Isolierstoffwerke Aktiengesellschaft, Austria

[21] Appl. No.: 09/011,468

[22] PCT Filed: Jun. 19, 1997

[86] PCT No.: PCT/AT97/00138

§ 371 Date: Feb. 17, 1998

§ 102(e) Date: Feb. 17, 1998

[87] PCT Pub. No.: WO97/49746

PCT Pub. Date: Dec. 31, 1997

[30] Foreign Application Priority Data

Jun. 26, 1996 [AT] Austria .................................. 1132/96

[51] Int. Cl.⁶ .................................................. C08G 18/04
[52] U.S. Cl. ..................... 156/331.1; 156/331.7; 264/134; 264/510; 427/385.5; 427/391; 526/301
[58] Field of Search ................... 528/59, 75, 45; 525/123; 427/385.5, 391; 156/331.1, 331.7; 526/301; 522/93, 97; 264/134, 510

[56] References Cited

U.S. PATENT DOCUMENTS

| 4,436,570 | 3/1984 | Neuhaus et al. ...................... 156/273.3 |
| 4,789,604 | 12/1988 | van der Hoeven ...................... 428/503 |
| 4,999,271 | 3/1991 | Etherington et al. .................... 430/284 |
| 5,147,959 | 9/1992 | Mishimoto et al. ...................... 528/48 |
| 5,248,752 | 9/1993 | Argyropoulous et al. ................ 528/49 |

FOREIGN PATENT DOCUMENTS

| 0 166 153 | 1/1986 | European Pat. Off. .......... B05D 3/06 |
| 0 254 232 | 1/1988 | European Pat. Off. . |
| 0 474 470 | 3/1992 | European Pat. Off. ........ B32B 27/30 |
| 0 683 188 | 11/1995 | European Pat. Off. ........ C08G 18/12 |
| 34 18 282 | 11/1985 | Germany ........................ B32B 27/08 |

OTHER PUBLICATIONS

JP 59 093719 A (Matsushita Denko KK), May 30, 1984.

*Primary Examiner*—Rachel Gorr
*Attorney, Agent, or Firm*—Bacon & Thomas, PLLC

[57] ABSTRACT

A coating system comprised of a resin component, a hardening component and additives. The resin component contains (meth)acrylic double bonds and at least two reactive hydroxyl groups, and the hardening component is comprised of a multifunctional, at least bifunctional isocyanate. The proportions of resin and hardening component in the coating system are stoichiometric. The coating system is suitable for producing laminated sheets with a surface layer of progressively hardening polyurethane acrylate. During a first hardening stage, the free hydroxyl groups of the resin component cross-link with the isocyanate groups of the hardening component, forming a urethane acrylate prepolymer which contains (meth)acrylic double bonds. In the second hardening state, the (meth)acrylic double bonds continue to cross-link, forming the urethane acrylate polymer coating of the sheet surface. The progressive cross-linking reaction may be controlled by altering the reaction parameters, such as pressure, temperature, choice of additives and chemical constitution of the hardening component.

14 Claims, No Drawings

COATING SYSTEM AND ITS USE FOR PRODUCING POLYURETHANE ACRYLATE SURFACE COATINGS FOR LAMINATED SHEETS

BACKGROUND OF THE INVENTION

1. Field of the Invention

The invention relates to a coating system comprised of a resin component, a hardener component, and additives, and its use in the preparation of laminated pressed plates with a surface coating consisting essentially of polyurethane acrylates.

2. Description of the Related Art

The use of laminated pressed plates for indoor and outdoor applications in the construction sector is known, where the surface of the plates must meet high requirements with regard to mechanical properties such as surface hardness and scratch resistance. In the case of laminated pressed plates for outdoor applications, high requirements are also imposed regarding resistance to UV radiation and weathering.

According to EP-A-166653, a laminated pressed plate with improved scratch resistance, namely at least 2 newtons, is provided which has on the surface of its plates an acrylic resin layer that has been cured by radiation. To manufacture these plates, the outermost web of the carrier material, e.g., a web of printed decorative paper, is coated on one side with polymerizable acrylic resins so that a solid resin film is created. Then this film is exposed at room temperature to electron beams, causing a radical cross-linking reaction to occur. Finally, this cross-linked acrylic resin film forming the outermost layer is pressed at high pressure and temperature in a pressing stack of the type customarily used for laminated pressed plates.

This method is tedious from the standpoint of machine technology inasmuch as an electron radiation source with a relatively complicated type of construction is required in order to achieve the desired surface hardness of the acrylic resin layer.

In addition, the cross-linked acrylic resin film is difficult to manipulate in discontinuous pressing processes inasmuch as it tends to curl easily and not lie flat when the pressing stack is being loaded in layers. This effect is based on a radiation polymerization induced high acrylate cross-linking density, which is in turn associated with material shrinkage of the acrylate polymers.

The invention is intended to remedy this problem.

SUMMARY OF THE INVENTION

The task underlying the invention is to provide a coating system of the type described above with which it is possible, in a process that can be easily carried out, to coat carrier materials and to press them using the type of pressing stack customarily used for laminated pressed plates, so that a weather-resistant surface coating with satisfactory surface hardness and scratch resistance is formed.

According to the invention, a coating system comprised of a resin component and a hardener component and additives is proposed which is characterized by the fact that the resin component contains not only free, reactive (meth)acrylic double bonds, but also at least two reactive hydroxyl groups per molecule, and that the hardener component consists of a polyfunctional, at least difunctional, isocyanate, where the resin and hardener components are present in stoichiometric ratio.

The coating system according to the invention has the additional advantage that the resin component has the following general formula:

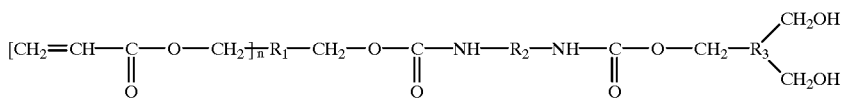

where $R_1$, signifies an alkyl or aliphatic polyether or polyester group, $R_2$ and $R_3$ signify aliphatic or cycloaliphatic groups, and $n=2-6$, and preferably $3-5$; and that the hardener component is an isocyanate with the following general formula:

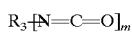

where m is at least 2 and preferably 3, and $R_3$ signifies an aliphatic or cycloaliphatic residue. Advantageously, the coating system according to the invention contains as the hardener component a trifunctional isocyanate whose reactivity at room temperature can also be blocked.

It further contains as additives radical formers that are stable at room temperature, as well as inhibitors to prevent a premature cross-linking reaction of the (meth)acrylic double bonds.

Fillers and/or colored pigments and/or flame retardants and/or agents to protect against the effects of light such as UV absorbers or radical traps can also be present as additives.

Furthermore, according to the invention, a process for manufacturing the above-mentioned resin components is proposed which is characterized by the fact that a polyfunctional (meth)acrylate monomer having at least one free hydroxyl group according to the general formula:

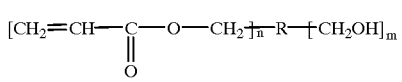

where $n=2-6$, preferably $3-5$, $m=0.5-1.5$, and R signifies an alkyl or aliphatic polyether or polyester group, is reacted with a diisocyanate in double stoichiometric excess in relation to the reactive hydroxyl groups in the (meth)acrylate monomer, with formation of a urethane group, and that the free isocyanate group then reacts with a polyfunctional, preferably trifunctional alcohol, with formation of a second urethane group, whereby a resin component containing not only free, reactive (meth)acrylic double bonds but also at least two reactive hydroxyl groups per molecule is formed.

This method can be used preferably to manufacture a urethane acrylate oligomer, and especially an aliphatic urethane acrylate oligomer, containing not only free, reactive (meth)acrylic double bonds but also at least two reactive hydroxyl groups per molecule.

The diisocyanate utilized in this process according to the invention preferably has functional groups with different reactivity.

It is advantageous to utilize as polyfunctional (meth) acrylate monomers those having four or five (meth)acrylic double bonds.

In addition, a process for coating carrier materials is provided, utilizing the coating system according to the invention in which the coating system is applied to one side of a carrier material, and where the carrier material which has been coated in such a manner is then dried at an elevated temperature, preferably under 140° C., so that the free hydroxyl groups in the resin component react with the isocyanate groups of the hardener component, with formation of a urethane acrylate prepolmer coating containing reactive (meth)acrylic double bonds.

By carefully controlling temperature during this process, the polyaddition reaction occurs between the free hydroxyl groups of the resin component and the functional groups of the hardener component, while the reactivity of the (meth) acrylic double bonds of the resin component is preserved. By this means, a flexible coated carrier material is produced that is easy to handle and can be stored for a sufficiently long period of time.

Suitable carrier materials are slabs of wood, plastic, or metal, and plastic or metal films. Semi-finished products can also be used as carrier materials, e.g., those based on materials containing fibers, such as paper, which have been impregnated with synthetic resins.

According to the invention, a process is also proposed for manufacturing laminated pressed plates, consisting of flat carrier materials impregnated with synthetic resin plus an outermost layer on at least one surface of the plate, which consists essentially of a polyurethane acrylate.

This process is characterized by the fact that a) the coating system according to the invention is applied to one side of the carrier material, that the carrier material which has been thus coated is then dried at elevated temperatures, preferably below 140° C., so that an initial cross-linking reaction of the free hydroxyl groups in the resin component with the isocyanate groups of the hardener component occurs, with formation of a urethane acrylate prepolymer containing reactive (meth)acrylic double bonds, that b) a pressing stack made of several carrier materials impregnated with synthetic resin is formed, on at least one side of which the carrier material manufactured according to a) is the outermost layer, and that c) this pressing stack created according to b) is pressed under high pressure and at temperatures above the drying temperature, preferably above 140° C., so that an additional cross-linking reaction of the reactive (meth) acrylic double bonds occurs, with formation of a urethane acrylate polymer.

By controlling the temperature in the process according to the invention, the resin component reacts in a two-stage process:

In the first reaction stage, the addition polymerization of the free hydroxyl groups of the resin component with the functional groups of the hardener component occurs, with preservation of the reactivity of the (meth)acrylic double bonds. A premature reaction of these (meth)acrylic double bonds is advantageously prevented by adding suitable inhibitors. If an impregnated decorative paper is preferably used as the carrier material, the former has a coating with a polyurethane acrylate prepolymer base after the first stage of the reaction which can be grasped and is non-blocking.

These coated carrier materials can thus readily be placed in layers in a pressing stack of the type customarily used for laminated pressed plates without causing any problems, i.e., without undesirable curling.

In the second reaction stage, the polymerization reaction of the (meth)acrylic double bonds in the resin component occurs, triggered by the high temperatures and pressures during pressing. The onset of the polymerization reaction is also triggered by the addition of suitable free radical formers.

In the process according to the invention, a trifunctional diisocyanate can be advantageously utilized as a hardener component, and its reactivity at room temperature can also be blocked.

Other additives that can be added to the coating system include fillers and/or colored pigments and/or flame retardants and/or agents that protect against the effects of light such as UV absorbers or free radical traps.

DETAILED DESCRIPTION OF THE PREFERRED EMBODIMENT

The invention will be further explained below using some embodiments as examples:

EXAMPLE 1 a) Preparation of the Resin Component:

100 parts by weight of the polyfunctional acrylate monomer, for example dipentaerythritol pentaacrylate with an OH equivalent weight of 525, are placed in a reaction vessel fitted with a stirrer, heater, cooler, reflux condenser, and gas inlet. The diisocyanate used is one that has functional groups with different reactivities, for example isophorone diisocyanate with an NCO equivalent weight of 111. The proportion of isophorone diisocyanate is 42.3 parts by weight.

0.5% hydroquinone as an inhibitor and 0.1% dibutyl tin dilaurate as a catalyst, plus 20 parts by weight n-butyl acetate as a diluent are also added to the reaction mixture. Dried air is passed into the reaction mixture for the entire duration of the reaction. The reaction mixture is stirred at a temperature of approximately 60° C., until it contains half as many free isocyanate groups as it did initially (determined using German Industrial standard DIN 53 185). This is caused by the formation of urethane bonds. Then 25.5 parts by weight of trimethylolpropane, a polyfunctional alcohol with an OH equivalent weight of 44.7, are added to the reaction mixture, which is allowed to continue to react until the isocyanate content has dropped to under 0.5% with formation of additional urethane bonds. Then the reaction mixture is cooled to room temperature, diluted to approximately 80% with n-butyl acetate, and more hydroquinone in the amount of 0.5% is added. This urethane acrylate oligomer solution has a viscosity at 25° C. of approximately 3000 mPa.s. It can be stored for several weeks with no change in viscosity. Its OH equivalent weight is 564. It can subsequently be used as a resin component in the coating system according to the invention.

b) Preparation of the Coating System According to the Invention:

To prepare a coating system according to the invention, 100 parts by weight of a resin component solution according to a) are mixed with 34.6 parts by weight of a hardener component in the form of a trimerized hexamethylene diisocyanate with an isocyanate equivalent weight of 195, and 0.1 parts by weight of tert-butyl perbenzoate are added as a free radical former. At 140° C., tert-butyl peroxide has a half-life of approximately 10 minutes.

The known additives for coating systems such as leveling agents, antifoaming agents, and degassing agents can also be added to this coating system. The working life of this coating system is 1 to 1.5 hours.

EXAMPLE 2

Preparation of the coating system is carried out as in Example 1. To prepare the resin component, an alkoxylated pentaerythritol triacrylate having a molecular weight of 550 is used as the polyfunctional acrylate monomer.

EXAMPLE 3

Preparation of the coating system is carried out as in Example 1. Instead of isophorone diisocyanate, however, trimethylhexamethylene diisocyanate is used to prepare the resin component.

EXAMPLE 4

Preparation of the coating system is carried out as in Example 3. An alkoxylated pentaerythritol triacrylate is used instead of dipentaerythritol pentaacrylate.

EXAMPLE 5

A coating system that can be prepared according to one of the Examples 1 through 4 is applied to a carrier material in a coating apparatus by means of spreader rolls. The carrier material can be a paper-plastic film composite, for example. The coating system is applied at a thickness of 40 g/m². Then a partial cross-linking reaction takes place at temperatures between 100 and 120° C. in the drier of a coating apparatus between the isocyanate group from the hardener component and the free hydroxyl groups of the resin component, with formation of a urethane acrylate prepolymer containing (meth)acrylic double bonds. Evaporation of the solvent that was used occurs at the same time. The speed at which the carrier material passes through the drier is selected in such a way that the coated carrier material will be present in the form of a film that can be grasped, which can be stored on supply rolls for an indefinite time.

To prepare laminated pressed plates with a polyurethane acrylate surface, it is then possible to cut strips from the supply roll in the proper size for making plates and to layer them with the other components of the layered packet as follows:

coated carrier material, with its coated surface facing toward the surface of the decorative layer,
decorative layer made of printed or pigmented decorative paper that has been impregnated with melamine resin,
core layer consisting of about 12 webs of paper impregnated with phenol resin,
decorative layer made of printed or pigmented decorative paper that has been impregnated with melamine resin,
optionally one more coated carrier material, with the coated surface facing toward the decorative layer.

This press stack is pressed at a pressure of 90 bar and a temperature of 140° C. for approximately 20 minutes. At these reaction temperatures, another cross-linking reaction of the reactive (meth)acrylic double bonds occurs, triggered by the free radical formers which are present in the coating system, with formation of a cured polyurethane acrylate. Simultaneously there is a curing of the impregnating resins used in the decorative and core layers. After about 20 minutes, the press stack is cooled down, still under pressure, and then it is removed from the press. Then the carrier material is removed from the surface of the plate, which now has a cured polyurethane acrylate layer on at least one side with a scratch resistance of approximately 4N (German Industrial Standard DIN 53 999, Part 10). The surface of the plate is also highly resistant to concentrated mineral acid such as sulfuric acid, and to solvents such as acetone. The weather resistance of the plate was tested according to ASTM G 53–84; after 3000 hours, the surface of the plate was found not to have lost any of its gloss or to have become discolored.

EXAMPLE 6

A coating system that can be prepared according to one of the Examples 1 through 4 is applied in a coating apparatus to a pre-impregnated decorative paper at a thickness of approximately 100 g/m² by means of spreading rolls. The pre-impregnation of the decorative paper enhances the adhesion of the coating system being used to the decorative paper. Some examples of impregnating resins that can be used for the pre-impregnation are acrylate resins or aminoplast resins, or mixed resins.

During the process, a blade is used to obtain a thickness of 80–100 g/m² for the coating system being applied. The decorative paper that has been coated in this way then passes through a 20 meter long drying channel at 120° C. At these temperatures, an initial cross-linking reaction occurs between the free hydroxyl groups of the resin component and the isocyanate groups of the hardener component, with formation of a urethane acrylate prepolymer containing still reactive (meth)acrylic double bonds.

The reactivity of the hardener component can be further influenced by the addition of blocked isocyanates that remain inert at room temperature but are reactive at temperatures between 100 and 120° C.

In addition, any solvents that may be present in the coating system are evaporated at these elevated temperatures. Thus, a coated decorative paper results, in the form of a film that can be grasped but is nonetheless flexible, and is resistant to solvents. This flexible film is rolled into supply rolls and can be kept in storage for an indefinite time.

To manufacture laminated pressed plates having a polyurethane acrylate surface, strips can now be cut from the storage rolls in shapes appropriate to the plate and placed in the layered packet with the other components as follows:

coated decorative paper, whose coating consists essentially of a polyurethane acrylate containing reactive acrylate groups
a core layer consisting of about 12 paper webs that have been impregnated with phenolic resin
coated decorative paper, whose coating consists essentially of a polyurethane acrylate containing reactive acrylate groups.

This press stack is pressed for about 20 minutes at a pressure of 90 bar and a temperature of 140° C. At these reaction temperatures, an additional cross-linking reaction of the (meth)acrylic double bonds takes place, with formation of the cured polyurethane acrylate. This cross-linking reaction is triggered by the free radical formers that are latently present in the coating system of the decorative layer. It can also be accelerated by "deblocking" the isocyanates in the hardener component that become reactive only at temperatures of 140° C. and above.

At the same time, curing of the impregnating resins in the decorative and core layers occurs. After about 20 minutes, the press stack is cooled down under pressure and removed from the press. The surface of the plate now has a cured polyurethane acrylate layer whose scratch resistance is about 4N (DIN 53 999, Part 10). It also is highly resistant to concentrated mineral acid such as sulfuric acid, and to solvents such as acetone. The weathering resistance of the plate was tested according to ASTM G 53–84; after 3000 hours, the surface of the plate was found not to have lost any of its gloss or to have become discolored.

A completely cross-linked and therefore scratch-resistant surface coating based on a urethane acrylate polymer is produced by the invention. The scratch hardness of this surface coating is at least 2N measured according to EN 438.

The surface coating according to the invention is suitable for both indoor and outdoor applications. Furthermore, it is resistant to solvents, so that undesirable graffiti can be easily removed.

We claim:

1. A process for preparing laminated pressed plates, consisting of flat carrier materials impregnated with synthetic resin, plus an outermost layer on at least one surface of the plate that consists essentially of a polyurethane acrylate, comprising
    a) applying to one side of a carrier material a coating system comprised of a resin component which contains both free, reactive (meth)acrylic double bonds and at least two reactive hydroxyl groups per molecule, a hardener component consisting of a polyfunctional, at least difunctional, isocyanate, where the resin component and hardener component are present in stoichiometric quantities and additives and subsequently drying the carrier material which has been coated in this manner at elevated temperatures so that an initial cross-linking reaction of the free hydroxyl groups in the resin component with the isocyanate groups of the hardener component occurs, with formation of a urethane acrylate prepolymer containing reactive (meth)acrylic double bonds,
    b) forming a press stack consisting of several carrier materials impregnated with synthetic resin, which has as its outermost layer on at least one side the carrier material prepared according to a), and
    c) pressing the press stack at high pressure and temperatures above the drying temperature so that an additional cross-linking reaction of the reactive (meth)acrylic double bonds occurs, with formation of a urethane acrylate polymer.

2. A process according to claim 1, wherein the resin component of the coating system has the general formula:

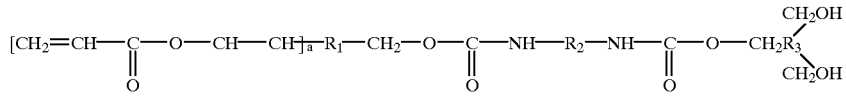

wherein $R_1$ signifies an alkyl or aliphatic polyether group or polyester group, $R_2$ and $R_3$ signify aliphatic or cycloaliphatic groups, and n=2–6; and that the hardener component of the coating system is an isocyanate which has the general formula:

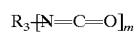

where m is at least 2 and $R_3$ signifies an aliphatic or cycloaliphatic residue.

3. A process according to claim 1, wherein a trifunctional diisocyanate is used as a hardener component.

4. A process according to claim 1, wherein a diisocyanate whose reactivity is blocked at room temperature is used as a hardener component.

5. A process according to claim 1, wherein an impregnated decorative paper is used as a carrier material.

6. A process according to claim 1, wherein as additives, fillers and/or colored pigments and/or flame retardants and/or agents that protect against the effects of light such as UV absorbers or free radical traps are added to the coating system.

7. A process according to claim 1, wherein free radical formers which are stable at room temperature and inhibitors to prevent a premature cross-linking reaction of the (meth)acrylic double bonds are added as additives.

8. A process according to claim 1, wherein said coated carrier material is dried at elevated temperatures below 140° C. and said press stack is pressed at temperature above 140° C.

9. A process according to claim 2, wherein n is 3–5.

10. A process according to claim 2, wherein a trifunctional diisocyanate is used as a hardener component.

11. A process according to claim 2, wherein a diisocyanate whose reactivity is blocked at room temperature is used as a hardener component.

12. A process according to claim 2, wherein an impregnated decorative paper is used as a carrier material.

13. A process according to claim 2, wherein as additives, fillers and/or colored pigments and/or flame retardants and/or agents that protect against the effects of light are added to the coating system.

14. A process according to claim 2, wherein free radical formers which are stable at room temperature and inhibitors to prevent a premature cross-linking reaction of the (meth)acrylic double bonds are added as additives.

* * * * *